United States Patent
Pimenta

(10) Patent No.: US 11,691,317 B2
(45) Date of Patent: Jul. 4, 2023

(54) COMPOSITION FOR APPLICATION IN ROTOMOLDING PROCESSES AND USE OF THE COMPOSITION

(71) Applicant: Braskem S.A., Camaçari (BR)

(72) Inventor: Eliomar Ricardo Pimenta, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 16/957,775

(22) PCT Filed: Dec. 26, 2017

(86) PCT No.: PCT/BR2017/050402
§ 371 (c)(1),
(2) Date: Jun. 25, 2020

(87) PCT Pub. No.: WO2019/126845
PCT Pub. Date: Jul. 4, 2019

(65) Prior Publication Data
US 2021/0060828 A1    Mar. 4, 2021

(51) Int. Cl.
*B29C 41/00* (2006.01)
*B29C 41/04* (2006.01)
*C08L 23/06* (2006.01)
*C08L 23/08* (2006.01)

(52) U.S. Cl.
CPC ............ *B29C 41/003* (2013.01); *B29C 41/04* (2013.01); *C08L 23/06* (2013.01); *C08L 23/0815* (2013.01); *C08L 2205/025* (2013.01); *C08L 2205/03* (2013.01); *C08L 2205/035* (2013.01); *C08L 2207/062* (2013.01); *C08L 2207/066* (2013.01)

(58) Field of Classification Search
CPC .......... C08L 23/04; C08L 23/06; C08L 23/08; C08L 2205/02; C08L 2205/025; C08L 2205/03; C08L 2205/035; C08L 2207/06; C08L 2207/062; C08L 2207/066
See application file for complete search history.

(56) References Cited

U.S. PATENT DOCUMENTS

| | | | |
|---|---|---|---|
| 5,530,055 A | 6/1996 | Needham | |
| 6,969,741 B2 | 11/2005 | Lustiger et al. | |
| 2005/0256266 A1 | 11/2005 | Lustiger et al. | |
| 2008/0125547 A1* | 5/2008 | Swogger | C08L 23/04 525/185 |
| 2013/0216736 A1* | 8/2013 | Sandkuehler | C08L 23/08 428/17 |
| 2015/0225554 A1* | 8/2015 | Iwasaki | B65D 1/40 428/36.92 |
| 2017/0197769 A1* | 7/2017 | Unai | B32B 27/306 |
| 2017/0247534 A1* | 8/2017 | Mariani | C08L 23/06 |
| 2021/0230324 A1* | 7/2021 | Park | C08F 4/65912 |

FOREIGN PATENT DOCUMENTS

| | | | |
|---|---|---|---|
| CN | 103724791 A | * | 4/2014 |
| EP | 2067799 | | 6/2009 |
| WO | WO 2013/140035 | | 9/2013 |
| WO | WO 2016/055959 | | 4/2016 |
| WO | WO 2019/126845 | | 7/2019 |

* cited by examiner

*Primary Examiner* — Irina S Zemel
*Assistant Examiner* — Jeffrey S Lenihan
(74) *Attorney, Agent, or Firm* — Osha Bergman Watanabe & Burton LLP

(57) ABSTRACT

The present invention relates to a composition for application in rotomolding processes comprising a blend of linear low density polyethylene (LLDPE) in concentrations from 20 to 40% by weight and melt flow index from 1 to 4 g/10 min; high density polyethylene (HDPE) in concentrations from 20 to 40% by weight and melt flow index from 5 to 9 g/10 min; low density polyethylene (LDPE) in concentrations from 0 to 20% by weight and melt flow index from 6 to 10 g/10 min; and linear low density polyethylene (LLDPE) in concentrations from 20 to 40% by weight and melt flow index from 3 to 7 g/10 min. A composition comprising feedstock of renewable origin, as well as its use is also disclosed.

12 Claims, No Drawings

COMPOSITION FOR APPLICATION IN ROTOMOLDING PROCESSES AND USE OF THE COMPOSITION

RELATED APPLICATION

This application is a National Phase of PCT Patent Application No. PCT/BR2017/050402 having International filing date of Dec. 26, 2017, the contents of which are incorporated herein by reference in their entirety.

FIELD AND BACKGROUND OF THE INVENTION

The present invention relates to a composition comprising a blend of polyethylenes for application in rotomolding processes.

Rotomolding is an industrial thermoplastic transformation process. Its primordial function is that of shaping plastic parts promoting the transformation of thermoplastic which, at a certain temperature, may be shaped and molded. Polyethylene, polypropylene and polyvinyl chloride are some examples of thermoplastics.

The rotomolding process originates from simple parts and even complex parts, with the advantage of low cost for the manufacturer, compared to other processes that have the same objective, as in the case of thermoforming, injection and blow molding. As an example of the range of products that the rotomolding is capable of producing, it is possible to mention both pieces with exclusive characteristics, as well as completely hermetic and hollow parts, and those of great proportions, such as silos or tanks of high capacities.

In a rotomolding process, the thermoplastic material is inserted into the mold cavity in an amount sufficient to provide the product with the desired thickness. Thereafter, the mold is closed, placed in a furnace and vertically and horizontally rotated.

With this movement, the mold is able to distribute the material at the beginning of melting on its walls by the effect of the centrifugal force, which results in the formation of a film. At the end of the stipulated time of the rotomolding process, the mold is withdrawn from the furnace and cooled to maintain the shape of the part, and finally the product is withdrawn from the mold.

The rotomolding mainly uses polyolefin resins, such as, for example, thermoplastic polymers of ethylene. The main desirable properties in rotomolded parts include surface finish, puncture or rupture resistance, chemical resistance and high durability.

Polyethylenes are produced by the polymerization of ethylene. Most ethylene currently comes from petroleum by cracking naphtha that comes from petroleum refining, but it can also be obtained from natural gas or petroleum gas.

There are different types of polyethylene, these being classified into: HDPE (High-Density Polyethylene), MDPE (Medium-Density Polyethylene, LLDPE (Linear Low-Density Polyethylene) and LDPE (Low Density Polyethylene).

According to standard ASTM D-4976, LDPE has a density ranging between 0.910 and 0.925 g/cm$^3$, MDPE between 0.925 and 0.940 g/cm$^3$, HDPE between 0.940 and 0.960 g/cm$^3$ and HDPE higher than 0.940 g/cm$^3$.

These polyethylenes are already known from the state of the art and have the following main characteristics:

a) LDPE: good flexibility, easily processable and good insulating properties.

b) LLDPE: high resistance to high temperatures and great flexibility.

c) MDPE: intermediate stiffness, widely used in the production of packaging and films for disposable diapers, in addition to rotomolding processes.

d) HDPE: high stiffness, creep, abrasion, impact and tension crack resistance under environmental and chemical stress.

Some patent documents already describe the use of polyethylenes in rotomolding processes, among which, the following are highlighted.

Patent application U.S. Pat. No. 5,530,055 describes a medium density polyethylene having a melt flow index between 3 to 8 g/10 min and a high density polyethylene having a density in the range of about 0.950 to 0.965 g/cm$^3$ and a melt flow index of not less than about 15 to 30 g/10 min.

Document WO 2016/055959 A1 describes a crosslinkable composition comprising polyethylene and the use thereof in rotomolding. More specifically, it is taught that the composition comprises from 80 to 98% by weight of at least one high density polyethylene and from 2 to 20% by weight and at least one linear low density polyethylene.

Document U.S. Pat. No. 6,969,741 describes a composition comprising two polyethylenes, the former having a melt flow index of 0.4 to 3.0 g/10 min and a density from 0.910 to 0.930 g/cm$^3$, and the latter having a melt flow index from 10 to 30 g/10 min and a density from 0.945 to 0.975 g/cm$^3$.

As shown, there is no prior art document that anticipates a polyethylene composition for use in rotomolding processes which comprises blending three or four polyethylenes comprising different indices of melt flow and density, thus enabling customization and improvement, in terms of mechanical strength, flexibility and finishing of the final product.

In addition, no prior art document describes the use of these polyethylenes as being of renewable origin.

An important characteristic of the use of renewable feedstock is the mitigating factor for climate change caused by air pollution. The use of petrochemical sources for the production of polymers, such as polyethylene, helps increase the emission of pollutants, raising the concentration of greenhouse gases, causing climate changes that affect the planet in a global and unequivocal way. The use of renewable feedstock causes, in the long term, a reduction in the concentration of polluting gases in the atmosphere, which makes it an important factor for the control of the greenhouse effect and the preservation of natural resources.

SUMMARY OF THE INVENTION

The present invention relates to a composition for application in rotomolding processes comprising a blend of linear low density polyethylene (LLDPE) in concentrations from 20 to 40% by weight and melt flow index from 1 to 4 g/10 min; high density polyethylene (HDPE) in concentrations from 20 to 40% by weight and melt flow index from 5 to 9 g/10 min; low density polyethylene (LDPE) in concentrations from 0 to 20% by weight and melt flow index from 6 to 10 g/10 min; and linear low density polyethylene (LLDPE) in concentrations from 20 to 40% by weight and melt flow index from 3 to 7 g/10 min.

Furthermore, the use of the claimed composition is disclosed.

DESCRIPTION OF SPECIFIC EMBODIMENTS OF THE INVENTION

The present invention describes a composition comprising a blend of polyethylenes for use in rotomolding processes.

The polyethylene blend used comprises polymers with different concentrations and flow rates, and can customize the physical and mechanical properties of the article produced according to the need.

The composition for application in rotomolding processes comprises linear low density polyethylene (LLDPE) in concentrations from 20 to 40% by weight and melt flow index from 1 to 4 g/10 min; high density polyethylene (HDPE) in concentrations from 20 to 40% by weight and melt flow index from 5 to 9 g/10 min; low density polyethylene (LDPE) in concentrations from 0 to 20% by weight and melt flow index from 6 to 10 g/10 min; and linear low density polyethylene (LLDPE) in concentrations from 20 to 40% by weight and melt flow index from 3 to 7 g/10 min.

In an embodiment of the present invention, LLDPE in concentrations from 20 to 40% by weight and melt flow index from 1 to 4 g/10 min; HDPE in concentrations from 20 to 40% by weight and melt flow index from 5 to 9 g/10 min e LDPE in concentrations from 0 to 20% by weight and melt flow index from 6 to 10 g/10 min are from renewable natural sources.

To this regard, the developed composition comprising at least 50% of polyethylene resins of renewable origin is capable of meeting the specific technical requirements for rotomolded parts such as surface finish and impact strength and at the same time provide the final product with appropriate physical and aesthetic properties.

Polyethylene from renewable natural source of the present invention is produced from natural feedstock, such as, for example, starch, such as corn; cellulose and hemicellulose contained in lignocellulosic materials such as leaves and bagasse, impure glycerol, such as in the saponification residue or biodiesel production processes, residues containing lactose and/or lactates, such as whey, and preferably from sugars, such as sugarcane.

Polyethylene from renewable natural source maintains the same properties, performance and versatility of applications of polyethylenes of fossil origin, besides being sustainable and ecologically correct. As an example, renewable polyethylene has reduced greenhouse gas emissions—every ton of renewable polyethylene produced captures and fixes $CO_2$ from the atmosphere, helping to reduce greenhouse gas emissions.

Furthermore, polyethylene from renewable natural source is recyclable in the same recycling chain as traditional polyethylene from fossil-source. Renewable polyethylene is not biodegradable, and therefore $CO_2$ captured by the product remains fixed throughout the life cycle of the plastic.

Still, because it has the same technical properties, appearance and versatility of application of polyethylene from fossil-source, the replacement of fossil-source polyethylene with renewable polyethylene does not require investment in new machines for its application. That is, it is possible to obtain a product with similar performance to that of fossil origin which is advantageously produced from feedstock from renewable sources.

The composition prepared in accordance with the present invention can be used to produce parts of general use and reservoirs. The term "general use" indicates any applications which may be produced from a blend of polyethylenes in rotomolding processes other than reservoirs, such as kayaks, toys, marine, agricultural and automotive parts, furniture and decorative articles.

Furthermore, by means of rotomolding using the present polyethylene composition, reservoirs can be produced, that is, large tanks. Preferably, the reservoir is a water tank.

In rotomolding processes for producing articles in general, the composition of the present invention ideally comprises from 0.5 to 15% by weight of LDPE.

In processes for reservoir production, the composition of the present invention may be free of LDPE.

In another embodiment, in reservoir production processes, the composition of the present invention comprises from 0.5 to 15% by weight, preferably from 0.5 to 2% by weight of LDPE.

In a rotomolding process, the polymeric material is added in the rotomold mold. After the feeding, the mold is closed with the aid of clamps or screws, and then it is taken to a furnace in biaxial rotation movement. The synergistic effect between the heat received from the furnace and the biaxial movement results in uniform heating of the material inside the mold. When the softening temperature of the polymer is reached inside the mold, it begins to adhere to the surface of the mold. The material remains in the furnace for a period sufficient for the parts to be completely molded.

Still in motion, the mold is withdrawn from the chamber and the cooling process begins, which may occur at ambient temperature, forced air jet and/or water spray or even more complex systems such as cooling sleeves enclosing the mold. The cooling process also has great influence on the mechanical properties of the molded part. If cooling is slow for materials such as polyethylene, there will be sufficient time for crystal growth, resulting in high rigidity parts, however with low impact strength. Conversely, quenching will cause abrupt temperature differences in the part wall, resulting in variations in the structure of the material with different levels of polymer shrinkage, which may result in warpage of the part. Cooling time depends on the following factors:

Ambient temperature;
Thickness of the part;
Material and thickness of the mold;
Air volume and speed;
Mold surface characteristics;
Water temperature and flow;
Rate of withdrawal of air and water from the cooling station.

After the mold and the part are cooled, the biaxial rotation movement ceases and the mold is driven to a demolding station. The demolding process of the polyethylene can start at a temperature of 60° C. After the part is extracted, the mold is loaded again with material and the cycle resumes.

EXAMPLES

Example 1

By way of example, the composition of the present invention for the production of articles of general use comprises:

| Compound | Melt flow index (g/10 min) | Ratio in the blend (%) |
| --- | --- | --- |
| LLDPE | 2.3 | 25 |
| HDPE | 7.0 | 35 |
| LDPE | 8.3 | 10 |
| LLDPE | 5.0 | 30 |

Example 2

Still, the same composition can be prepared from renewable natural sources, obtaining results similar to polyethylene of fossil origin. In this case, the composition comprises:

| Compound | Melt flow index (g/10 min) | Ratio in the blend (%) | Renewable % |
|---|---|---|---|
| LLDPE | 2.3 | 25 | 87 |
| HDPE | 7.0 | 35 | 94 |
| LDPE | 8.3 | 10 | 95 |
| LLDPE | 5.0 | 30 | 0 |

Example 3

In addition, an example of the composition prepared according to the present invention for producing reservoirs comprises:

| Compound | Melt flow index (g/10 min) | Ratio in the blend (%) |
|---|---|---|
| LLDPE | 2.3 | 35 |
| HDPE | 7.0 | 25 |
| LLDPE | 5.0 | 40 |

Example 4

Likewise, the composition prepared from renewable natural sources for the production of reservoirs comprises:

| Compound | Melt flow index (g/10 min) | Ratio in the blend (%) | Renewable % |
|---|---|---|---|
| LLDPE | 2.3 | 35 | 87 |
| HDPE | 7.0 | 25 | 94 |
| LLDPE | 5.0 | 40 | 0 |

In order to demonstrate that the blends of polyethylenes of renewable natural origin of the present invention exhibit very similar values of melt flow index and density of polyethylenes of fossil origin, flow rate tests were performed according to ASTM D 1238 and density according to ASTM D 792.

The results for the general use composition, according to Example 2, are given below:

| | Unities | Values of the present invention | Typical values |
|---|---|---|---|
| MFI (190° C./2.16 kg) | g/10 min | 4.3 | 4.5 |
| DE | g/cm$^3$ | 0.939 | 0.938 |

As for the composition prepared for use in reservoirs according to Example 4, the results are as follows:

| | Unities | Values of the present invention | Typical values |
|---|---|---|---|
| MFI (190° C./2.16 kg) | g/10 min | 3.9 | 4.0 |
| DE | g/cm$^3$ | 0.938 | 0.939 |

While the present invention has been widely described, it is obvious to those skilled in the art that various changes and modifications may be performed to improve the design without such changes being outside the scope of the invention.

The invention claimed is:

1. A composition for application in rotomolding processes, comprising:
 a first linear low density polyethylene (LLDPE) in concentrations from 20 to 40% by weight and melt flow index from 1 to 4 g/10 min;
 high density polyethylene (HDPE) in concentrations from 20 to 40% by weight and melt flow index from 5 to 9 g/10 min;
 low density polyethylene (LDPE) in concentrations from 0.5 to 20% by weight and melt flow index from 6 to 10 g/10 min; and
 a second linear low density polyethylene (LLDPE) different from the first LLDPE in concentrations from 20 to 40% by weight and melt flow index from 3 to 7 g/10 min;
 wherein the melt flow index ($I_{21.6}$) is measured according to ASTM D1238.

2. The composition according to claim 1, characterized in that the first LLDPE in concentrations from 20 to 40% by weight and melt flow index from 1 to 4 g/10 min; HDPE in concentrations from 20 to 40% by weight and melt flow index from 5 to 9 g/10 min, and LDPE in concentrations from 0.5 to 20% by weight and melt flow index from 6 to 10 g/10 min derive from renewable natural source.

3. The composition according to claim 2, characterized in that the renewable natural source polyethylene is produced from natural feedstock selected from: starch, cellulose and hemicellulose contained in lignocellulosic materials, impure glycerol, residues containing lactose and/or lactates, and sugars.

4. The composition according to claim 1, characterized in that the LDPE is present in concentrations from 0.5 to 15% by weight.

5. A process of producing parts of general use or reservoir, the process comprising molding the composition as defined in claim 1.

6. The process according to claim 5, being of producing parts of general use, characterized in that the LDPE is present in concentrations between 0.5 and 15% by weight.

7. The process according to claim 5, characterized in that articles of general use are selected from kayaks, toys, marine, agricultural and automotive parts, furniture and decorative articles.

8. The process according to claim 5, being of producing a reservoir, characterized in that the LDPE is present in concentrations between 0.5 and 15% by weight.

9. The process according to claim 8, characterized in that the LDPE is present in concentrations between 0.5 and 2% by weight.

10. The process according to claim 8, characterized in that the reservoir is a tank.

11. The process according to claim 10, characterized in that the reservoir is a water tank.

12. The process according to claim 5, characterized in that it is a rotomolding process.

* * * * *